US010697067B2

(12) United States Patent
Ishizuka et al.

(10) Patent No.: US 10,697,067 B2
(45) Date of Patent: Jun. 30, 2020

(54) STEEL SHEET FOR A FUEL TANK

(71) Applicant: NIPPON STEEL & SUMITOMO METAL CORPORATION, Tokyo (JP)

(72) Inventors: Kiyokazu Ishizuka, Tokyo (JP); Noriyuki Maekawa, Tokyo (JP); Hiroaki Uramoto, Tokyo (JP); Masahiro Fuda, Tokyo (JP); Ikuro Yamaoka, Tokyo (JP); Kenichiro Matsumura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 222 days.

(21) Appl. No.: 15/546,886

(22) PCT Filed: Feb. 1, 2016

(86) PCT No.: PCT/JP2016/052912
§ 371 (c)(1),
(2) Date: Jul. 27, 2017

(87) PCT Pub. No.: WO2016/125741
PCT Pub. Date: Aug. 11, 2016

(65) Prior Publication Data
US 2018/0002813 A1 Jan. 4, 2018

(30) Foreign Application Priority Data
Feb. 3, 2015 (JP) .................................. 2015-019369

(51) Int. Cl.
| | |
|---|---|
| B32B 15/04 | (2006.01) |
| B32B 15/18 | (2006.01) |
| B32B 15/08 | (2006.01) |
| C25D 7/00 | (2006.01) |
| C23C 28/00 | (2006.01) |
| C23C 22/42 | (2006.01) |
| C25D 5/48 | (2006.01) |
| C25D 7/06 | (2006.01) |
| C23C 22/44 | (2006.01) |
| B32B 15/01 | (2006.01) |
| C25D 5/12 | (2006.01) |
| B60K 15/03 | (2006.01) |
| C25D 3/56 | (2006.01) |

(52) U.S. Cl.
CPC ............ *C23C 22/42* (2013.01); *B32B 15/015* (2013.01); *B32B 15/18* (2013.01); *C23C 22/44* (2013.01); *C23C 28/00* (2013.01); *C25D 5/12* (2013.01); *C25D 5/48* (2013.01); *C25D 7/00* (2013.01); *C25D 7/0614* (2013.01); *C23C 2222/20* (2013.01); *C25D 3/562* (2013.01)

(58) Field of Classification Search
None
See application file for complete search history.

(56) References Cited

U.S. PATENT DOCUMENTS

2009/0110921 A1* 4/2009 Kaneto .................. C09D 5/084
428/341
2015/0361572 A1* 12/2015 Zhao ...................... C23C 22/44
428/621

FOREIGN PATENT DOCUMENTS

| CN | 1478921 A | 3/2004 |
|---|---|---|
| CN | 101228294 A | 7/2008 |
| CN | 101619474 A | 1/2010 |
| CN | 106133194 A | 11/2016 |
| EP | 2 957 657 A1 | 12/2015 |
| EP | 3130691 A1 | 2/2017 |
| JP | 5-106058 A | 4/1993 |
| JP | 9-324279 A | 12/1997 |
| JP | 9-324281 A | 12/1997 |
| JP | 9-324282 A | 12/1997 |
| JP | 2985767 B2 | 12/1999 |
| JP | 2004-169122 A | 6/2004 |
| JP | 2005-68511 A | 3/2005 |
| JP | 2007-51365 A | 3/2007 |
| JP | 2007-186745 A | 7/2007 |

(Continued)

OTHER PUBLICATIONS

Chinese Office Action and Search Report for corresponding Chinese Application No. 201680007602.7, dated Sep. 27, 2018, with a partial English translation.
Indian Office Action for corresponding Indian Application No. 201717026400, dated Jan. 18, 2019, with English translation.
Extended European Search Report for corresponding European Application No. 16746572.3, dated Jul. 12, 2018.
Korean Office Action for corresponding Korean Application No. 10-2017-7020701, dated May 4, 2018, with English translation.
European Office Action, dated Mar. 25, 2019, for corresponding European Application No. 16746572.3.

(Continued)

*Primary Examiner* — Xiaobei Wang
(74) *Attorney, Agent, or Firm* — Birch, Stewart, Kolasch & Birch, LLP

(57) ABSTRACT

A steel sheet for a fuel tank according to the present invention includes: a Zn—Ni alloy plated layer placed on one surface or each of both surfaces of a base metal; and a chromate-free chemical conversion coating film which is placed over the Zn—Ni alloy plated layer. The Zn—Ni alloy plated layer has a crack starting from an interface with the chromate-free chemical conversion coating film and reaching an interface with the steel sheet, the chromate-free chemical conversion coating film consists of an organosilicon compound consisting of a condensation polymer of a silane coupling agent, a phosphoric acid compound and/or a phosphonic acid compound, a vanadium compound, and a titanium compound and/or a zirconium compound, and a concentration of a total of amounts in terms of metal, per surface, of the phosphoric acid compound and/or the phosphonic acid compound+the vanadium compound+the titanium compound and/or the zirconium compound, is 5 mass % to 20 mass %.

5 Claims, No Drawings

(56) References Cited

FOREIGN PATENT DOCUMENTS

| | | |
|---|---|---|
| JP | 2011-38139 A | 2/2011 |
| JP | 2011-195941 A | 10/2011 |
| JP | 2013-133527 A | 7/2013 |
| JP | 2013-227646 A | 11/2013 |
| WO | WO 2007/011008 A1 | 1/2007 |
| WO | WO 2014/117609 A1 | 8/2014 |

OTHER PUBLICATIONS

1st Office Action for JP 2016-533733 dated Jul. 12, 2016.
1st Office Action for TW 105103298 dated Sep. 6, 2016.
International Search Report for PCT/JP2016/052912 dated Mar. 8, 2016.
Written Opinion of the International Searching Authority for PCT/JP2016/052912 (PCT/ISA/237) dated Mar. 8, 2016.
European Office Action, dated Dec. 5, 2019, for European Application No. 16746572.3.
Brazilian Office Action and Search Report dated Feb. 4, 2020, for Brazilian Application No. 112017011835-1, with partial translation.

\* cited by examiner

STEEL SHEET FOR A FUEL TANK

TECHNICAL FIELD

The present invention relates to a steel sheet for a fuel tank.

BACKGROUND ART

With tightening environmental regulation in recent years, market needs for materials that do not contain harmful metals have been increased. For that reason, in the field of automobiles, the switching from a lead-tin alloy plated steel sheet, which has been a main ingredient of fuel tanks, to a material not containing lead has been promoted. Accordingly, to a unique required performance of the fuel tanks, which is high inner corrosion resistance with respect to an enclosed fuel is enclosed (hereinafter, also referred to as fuel corrosion resistance), many suggestions are given involving using zinc-based plated steel sheets instead of lead-tin-based plated steel sheets as inner and outer sheets of automobiles (for example, see the following Patent Literatures 1 to 3).

The technologies using zinc-based plated steel sheets described above each have an assumption that chromate treatment is performed, and therefore are incompatible with the recent market needs for not using harmful metals. For this reason, as described in the following Patent Literatures 4 to 9, a chromate-free zinc-based plated steel sheet that does not contain chromium for a fuel tank is disclosed.

Citation List

Patent Literature

Patent Literature 1: JP H5-106058A
Patent Literature 2: JP H9-324279A
Patent Literature 3: JP H9-324281A
Patent Literature 4: JP 2004-169122A
Patent Literature 5: JP 2007-186745A
Patent Literature 6: JP 2013-133527A
Patent Literature 7: JP 2013-227646A
Patent Literature 8: JP 2011-38139A
Patent Literature 9: WO2007/011008

SUMMARY OF INVENTION

Technical Problem

However, compared to the fuel corrosion resistance of the conventional zinc-based plated steel sheet subjected to the chromate treatment, the fuel corrosion resistance of the chromate-free zinc-based plated steel sheets for fuel tanks disclosed in the Patent Literatures 4 to 9 are not sufficient in fuel corrosion resistance under severer conditions, for example, corrosion resistance over a longer time period, and corrosion resistance in the case where damage in the coating film has occurred during processing. Therefore, the chromate-free zinc-based plated steel sheets for fuel tanks require further improvement.

For example, Patent Literatures 4 and 5 each disclose a chromate-free coating film mainly containing an organic resin. However, when such a chromate-free coating film mainly containing an organic resin is exposed to a fuel environment for a long time period, the chromate-free coating film has a defect that the organic resin is swelled by the fuel, and adhesion between surfaces of plating decreases. It is assumed that such swelling of the organic resin is a factor in insufficient corrosion resistance.

Further, Patent Literatures 6 and 7 each disclose a phosphoric acid-based inorganic chromate-free coating film. However, the phosphoric acid-based inorganic chromate-free coating film has a defect that the phosphoric acid-based inorganic chromate-free coating film does not necessarily have sufficient water resistance, and lacks corrosion resistance in particular in the case where a fuel contains dew condensation water.

Patent Literature 8 describes that a chromate-free chemical conversion treated layer is formed on a zinc-nickel alloy plated layer having a crack. However, the chemical conversion treated layer mainly contains a urethane-based aqueous resin, and is improved in corrosion resistance, but has a defect that the chemical conversion treated layer is not imparted with the corrosion resistance with respect to deteriorated gasoline. The reason therefor is, as will be described later, phosphoric acid, vanadium, titanium, and zirconium contained in the chemical conversion treated film are not sufficient for imparting the corrosion resistance with respect to deteriorated gasoline.

Patent Literature 9 discloses a steel sheet obtained by coating a zinc-based plated steel sheet with an aqueous metal surface treatment agent containing an organosilicon compound. However, the steel sheet is improved in corrosion resistance, but has a defect that the steel sheet is not sufficient in terms of corrosion resistance with respect to deteriorated gasoline.

Accordingly, the present invention has been made in view of the above problems, and the present invention aims to provide a steel sheet for a fuel tank, which can exhibit excellent corrosion resistance under an environment in which various fuels exist, the fuels including a fuel containing an organic acid such as deteriorated gasoline and a fuel containing dew condensation water in addition to an organic acid, without using environmental burden substances such as lead and chromium.

Solution to Problem

The inventors of the present invention have investigated improvement in fuel corrosion resistance in a chromate-free zinc-based plated steel sheet, and have found that remarkable improvement can be obtained by making a zinc-based plated layer to be a Zn—Ni alloy plated layer, forming a predetermined crack on the plated layer, and providing a chromate-free chemical conversion coating film.

The gist of the present invention accomplished on the basis of the above finding is as follows.

(1)

A steel sheet for a fuel tank, the steel sheet including:

a Zn—Ni alloy plated layer which is placed on one surface or each of both surfaces of a base metal; and a chromate-free chemical conversion coating film which is placed over the Zn—Ni alloy plated layer, in which the Zn—Ni alloy plated layer has a crack starting from an interface between the Zn—Ni alloy plated layer and the chromate-free chemical conversion coating film and reaching an interface between the Zn—Ni alloy plated layer and the steel sheet, the chromate-free chemical conversion coating film consists of an organosilicon compound consisting of a condensation polymer of a silane coupling agent, a phosphoric acid compound and/or a phosphonic acid compound, a vanadium compound, and a titanium compound and/or a zirconium compound, and a concentration of a total of amounts in terms of metal, per surface of the chromate-free chemical conversion coating film, of the phosphoric acid compound and/or the phosphonic acid compound+the vanadium compound+the titanium compound and/or the zirconium compound, is more than or equal to 5 mass % and less than or equal to 20 mass %.

(2)

The steel sheet for a fuel tank according to (1), in which one surface of the base metal has the Zn—Ni alloy plated layer and the chromate-free chemical conversion coating film, and a surface opposite to the one surface does not have the Zn—Ni alloy plated layer and the chromate-free chemical conversion coating film.

(3)

The steel sheet for a fuel tank according to (2), in which a deposition amount of Zn and/or Ni on the surface not having the Zn—Ni alloy plated layer and the chromate-free chemical conversion coating film is 0.01 to 0.5 g/m$^2$.

(4)

The steel sheet for a fuel tank according to any one of (1) to (3), in which in the case where a cross section of the Zn—Ni alloy plated layer is observed, the number of the cracks in a visual field of 100 μm is more than or equal to 5 and less than or equal to 50.

(5)

The steel sheet for a fuel tank according to any one of (1) to (4), in which the number X of the cracks in a visual field of 100 μm obtained by observing the cross section of the Zn—Ni alloy plated layer and a concentration Y (%) of a total of amounts in terms of metal of P+V+Ti+Zr in the chromate-free chemical conversion coating film satisfy a relationship represented by the following formula (I), $$Y \geq -0.06X+6.8 \qquad (I).$$

(6)

The steel sheet for a fuel tank according to (5), in which in the case where a cross section of the Zn—Ni alloy plated layer is observed, the number of the cracks in the visual field of 100 μm is more than or equal to 5 and less than 50, and a maximum width of a crack is less than 0.5 μm.

Advantageous Effects of Invention

According to the present invention, there can be provided a steel sheet for a fuel tank, which exhibits excellent corrosion resistance under an environment in which various fuels exist, the fuels including a fuel containing an organic acid such as deteriorated gasoline and a fuel containing dew condensation water in addition to an organic acid, without using environmental burden substances such as lead and chromium.

DESCRIPTION OF EMBODIMENTS

Hereinafter, preferred embodiments of the present invention will be described in detail.

The present invention relates to a steel sheet for a fuel tank that uses a zinc-based plated steel sheet which is excellent in corrosion resistance to various fuels, does not use lead or chromate treatment, and is environmentally friendly. The present invention also relates to a steel sheet used for an automobile, a motorcycle, industrial machinery, and construction machinery, and in addition, used for a tank in which a fuel is enclosed and a part of the tank.

The steel sheet for a fuel tank according to an embodiment of the present invention includes: a Zn—Ni alloy plated layer which is placed on one surface or each of both surfaces of a base metal; and a predetermined chromate-free chemical conversion coating film (hereinafter, also simply referred to as "chemical conversion coating film") which is placed over the Zn—Ni alloy plated layer (hereinafter, also simply referred to as "plated layer").

In the case where the steel sheet for a fuel tank according to the present invention is used for a fuel tank, a surface having the Zn—Ni alloy plated layer and the chromate-free chemical conversion coating film which is placed over the Zn—Ni alloy plated layer is a fuel tank-inner surface (hereinafter, referred to as inner surface). In that case, the surface opposite to the inner surface is a fuel tank-outer surface (hereinafter, referred to as outer surface).

In the steel sheet according to the present invention, the Zn—Ni alloy plated layer may be provided to each of the both surfaces. However, in order to make the weldability of the steel sheet satisfactory, it is preferred that the surface to be the outer surface of the fuel tank do not have the plated layer. Further, for example, in the case where the steel sheet is used as a fuel tank for a motorcycle which places importance on the visual quality of the coating of the outer surface of the fuel tank, it is preferred that the outer surface of the fuel tank do not have the plated layer in order to make the external appearance of the coating satisfactory. On the other hand, in the case where the steel sheet is used for the case where the outer surface of the fuel tank also requires high corrosion resistance, it is preferred that the outer surface of the fuel tank have the plated layer. In the steel sheet according to the present invention, the presence and absence of the plated layer on the outer surface and the inner surface can be controlled in accordance with the use.

In order to make the outer surface into a state that does not have the plated layer, there can be employed a method not involving applying electric current to the outer side to be the non-plated surface during electroplating. Alternatively, there can be employed a method involving performing plating, and then removing the plating on the outer side to be the non-plated surface through an electrochemical method (for example, anode electrolytic treatment) or a mechanical method (for example, grinding with a brush). Further, the above-mentioned methods can be used in combination.

Owing to the above methods, the non-plated surface (outer surface) of the steel sheet according to the present invention can be completely prevented from having Zn and/or Ni being deposited thereon. In that case, the deposition amount of Zn and/or Ni is 0. As described above, this is for improving the weldability and the coating property of the steel sheet. It is desirable that the deposition amount be 0.01 to 0.5 g/m$^2$, preferably 0.01 to 0.3 g/m$^2$, more preferably 0.01 to 0.1 g/m$^2$.

Here, a base material of the steel sheet for a fuel tank according to an present embodiment is not particularly limited, and any known steel sheet can be used appropriately as long as it is a steel sheet that is generally used as a base material of a zinc-based plated steel sheet.

The Zn—Ni alloy plated layer formed on at least one surface of the steel sheet is an alloy plated layer containing at least an alloy of zinc and nickel. The Zn—Ni alloy plated layer can be formed by a known plating method such as an electroplating method.

The Zn—Ni alloy plated layer is characterized in having a crack starting from a surface layer of the plated layer (in other words, an interface between the Zn—Ni alloy plated layer and the chromate-free chemical conversion coating film) and reaching the base metal (in other words, an interface between the steel sheet, which is the base material, and the Zn—Ni alloy plated layer). Note that the presence of the crack can be confirmed by observing a cross section using a scanning electron microscope (SEM).

It is a well-known phenomenon that the fuel corrosion resistance improves in the case where there is a crack in the Zn—Ni alloy plated layer, on the assumption that the chromate treatment is performed. Such a phenomenon can be explained through: improvement in adhesion of the coating film owing to an anchor effect of a chromate coating film entered in the crack; and an effect of preventing a new crack from being generated during press working when there is a crack in the plated layer in advance. It is presumed that such effects can also be seen in the steel sheet described in Patent Literature 8.

On the other hand, in a chromate-free chemical conversion coating film that has recently been studied, no remarkable fuel corrosion resistance-improvement effect can be expected even if there is a crack in the plated layer, and, on the contrary, the fuel corrosion resistance deteriorates. It is considered that the reason therefor is that there is no strong corrosion inhibitor such as $Cr^{6+}$, which exists in the chromate coating film.

In order to exhibit fuel corrosion resistance, in particular, satisfactory corrosion resistance under a fuel environment including an organic acid such as deteriorated gasoline and in addition dew condensation water, and also under a condition in which a part of the coating film is damaged during press working, it is necessary that, in addition to that a crack exist in the Zn—Ni alloy plated layer, a specific chromate-free chemical conversion coating film described later be formed.

The crack in the Zn—Ni alloy plated layer according to the present embodiment refers to a crack starting from the plated layer surface and reaching the base metal. It is assumed that function mechanisms of the crack are achieved from, in addition to the anchor effect and the prevention of a new crack from being generated during processing as described above, a corrosion inhibiting effect at the damaged parts in the chemical conversion coating film and the plated layer during processing.

The corrosion inhibiting effect of the steel sheet according to the present invention will be described.

In the case where a steel sheet that does not have a crack in a Zn—Ni alloy plated layer is damaged at a coating film and a plated layer at the surface due to press working or the like, a base metal at which a flaw occurs is exposed, the anticorrosion function with a sacrifice of the plated layer alone is not sufficient, and the corrosion progresses. On the other hand, in the case where the steel sheet according to the present invention is damaged at the coating film and the plated layer at the surface due to press working or the like, the base metal at which a flaw occurs is exposed, however, since the chemical conversion coating film that has entered the crack in the plated layer is present in the vicinity of the exposed base metal and since a specific substance that has a corrosion inhibiting function is eluted from the chemical conversion coating film according to the present invention, as will be described later, the corrosion can be remarkably inhibited.

Next, the chromate-free chemical conversion coating film according to the present embodiment will be described.

The chromate-free chemical conversion coating film consists of: an organosilicon compound consisting of a condensation polymer of a silane coupling agent; (i) a phosphoric acid compound and/or a phosphonic acid compound; (ii) a vanadium compound; and (iii) a titanium compound and/or a zirconium compound. Here, it is necessary that a concentration of a total of amounts in terms of metal, per surface of the chromate-free chemical conversion coating film, of P+V+Ti+Zr (in more detail, the total mass in terms of metal, per surface, of the above-mentioned compounds (i) to (iii) with respect to the total solid content of the chemical conversion coating film) be more than or equal to 5 mass % and less than or equal to 20 mass %.

The coating film that mainly contains an organosilicon compound consisting of a condensation polymer of a silane coupling agent is assumed to have, although the mechanism therefor is not clear, satisfactory wettability with the Zn—Ni alloy plated layer, and enters a small crack in the plated layer to exhibit the above-mentioned effects. With that, the coating film that mainly contains an organosilicon compound consisting of a condensation polymer of a silane coupling agent is excellent in water resistance and swelling resistance to a hydrocarbon, and exhibits satisfactory fuel corrosion resistance.

The phosphoric acid compound and/or the phosphonic acid compound, the vanadium compound, and the titanium compound and/or the zirconium compound elute P, V, and Ti and/or Zr, respectively, under a corrosive environment, function as corrosion inhibitors, and consequently exhibit the above-mentioned effects. The corrosion inhibiting effect is exhibited particularly in the case where all P, V, and Ti (and/or Zr) are present. In the case where the concentration of the total of amounts in terms of metal of P+V+Ti+Zr in the chemical conversion coating film is less than 5%, the corrosion resistance with respect to deteriorated gasoline is insufficient. On the other hand, in the case where the concentration of the total of amounts in terms of metal of P+V+Ti+Zr in the chemical conversion coating film exceeds 20%, general corrosion resistance such as corrosion resistance with respect to a brine environment decreases. Here, the concentration of the total of amounts in terms of metal of P+V+Ti+Zr in the chemical conversion coating film is preferably more than or equal to 5 mass % and less than or equal to 15 mass %. It is more preferably more than or equal to 7 mass % and less than or equal to 15 mass %, and still more preferably more than or equal to 7.4 mass % and less than or equal to 13.5 mass %.

Note that the method of measuring the concentration of the total of amounts in terms of metal of P+V+Ti+Zr in the chemical conversion coating film is not particularly limited. The measurement can be performed thorough a known measurement method, and can be performed through an X-ray fluorescence method, for example. The X-ray fluorescence method is a method involving creating in advance a calibration curve with a deposition amount-known sample by means of the gravimetric method or the like for each of elements of interest, and calculating a deposition amount from an X-ray fluorescence intensity of a sample of interest.

Specific examples of the silane coupling agent which is a base of the organosilicon compound include vinyl trimethoxy silane, vinyl triethoxy silane, 3-glycidoxypropyl trimethoxy silane, 3-glycidoxypropyl triethoxy silane, 3-glycidoxypropyl methyl dimethoxy silane, 3-glycidoxypropyl methyl diethoxy silane, 2-(3,4 epoxycyclohexyl) ethyl trimethoxy silane, 3-methacryloxypropyl methyl diethoxy silane, 3-methacryloxypropyl trimethoxy silane, 3-methacryloxypropyl methyl diethoxy silane, 3-methacryloxypropyl triethoxy silane, 3-acryloxypropyl trimethoxy silane, 3-aminopropyl trimethoxy silane, 3-aminopropyl triethoxy silane, N-2(aminoethyl)3-aminopropyl trimethoxy silane, N-2(aminoethyl)3-aminopropyl triethoxy silane, N-2

(aminoethyl)3-aminopropyl methyl diethoxy silane, bis(t-rimethoxysilyl propyl)amine, 3-triethoxysilyl-N-(1,3-dimethyl-butylidene)propyl amine, N-phenyl-3-aminopropyl trimethoxy silane, 3-ureidopropyl triethoxy silane, 3-mercaptopropyl methyl diethoxy silane, 3-mercaptopropyl trimethoxy silane, 3-mercaptopropyl triethoxy silane, 3-isocyanatepropyl triethoxy silane, and bis(trimethoxysilyl)hexane. Those silane coupling agents may be used alone or two or more may be used in combination. The silane coupling agent(s) may be dissolved or dispersed in water, the resultant is stirred at predetermined temperature for a predetermined period of time to be subjected to polycondensation, and thus, an organosilicon compound can be obtained.

The phosphoric acid compound according to the present embodiment is not particularly limited, and examples thereof include phosphoric acid, metaphosphoric acid, pyrophosphoric acid, polyphosphoric acid, primary, secondary, or tertiary phosphoric acid alkali salt, primary, secondary, or tertiary phosphoric acid ammonium salt, and primary phosphate of polyvalent metals represented by magnesium primary phosphate, aluminum primary phosphate, and manganese primary phosphate.

The phosphonic acid compound according to the present embodiment is not particularly limited, and examples thereof include 1-hydroxyethylidene, 1,1'-diphosphonic acid, aminotrimethylene phosphonic acid, ethylenediamine tetramethylene phosphonic acid, hexamethylenediamine tetramethylene phosphonic acid, diethylenetriamine pentamethylene phosphonic acid, and salts thereof.

The vanadium compound according to the present embodiment is not particularly limited, and examples thereof include vanadium pentoxide, metavanadic acid, ammonium metavanadate, sodium metavanadate, vanadium oxytrichloride, vanadium trioxide, vanadium dioxide, vanadium oxysulfate, vanadium oxyacetylacetonate, vanadium acetylacetonate, vanadium trichloride, and phosphovanadomolybdic acid. In addition, it is also usable that the resultant obtained by reducing a pentavalent vanadium compound to a tetravalent, trivalent, or divalent compound using an organic compound having at least one functional group selected from the group consisting of a hydroxyl group, a carbonyl group, a carboxyl group, a primary amino group, a secondary amino group, a tertiary amino group, an amide group, a phosphoric acid group, and a phosphonic acid group.

The titanium compound according to the present embodiment is not particularly limited, and examples thereof include hexafluorotitanic acid or salts thereof, tetramethoxy titanium, tetraethoxy titanium, tetra-i-propoxy titanium, tetra-n-propoxy titanium, tetra-n-butoxy titanium, tetra-i-butoxy titanium, tetra-sec-butoxy titanium, tetra-t-butoxy titanium, tetraacetylacetonato titanium, diisopropoxy bis(acetylacetonato)titanium, isopropoxy(2-ethyl-1,3-hexanediolato)titanium, diisopropoxy bis(triethanolaminato)titanium, di-n-butoxy bis(triethanolaminato)titanium, and hydroxybis(lactato)titanium.

The zirconium compound according to the present embodiment is not particularly limited, and examples thereof include hexafluorozirconic acid or salts thereof, tetramethoxy zirconium, tetraethoxy zirconium, tetra-i-propoxy zirconium, tetra-n-propoxy zirconium, tetra-n-butoxy zirconium, tetra-i-butoxy zirconium, tetra-sec-butoxy zirconium, tetra-t-butoxy zirconium, tetraacetylacetonato zirconium, diisopropoxy bis(acetylacetonato)zirconium, isopropoxy(2-ethyl-1,3-hexanediolato)zirconium, diisopropoxy bis(triethanolaminato)zirconium, di-n-butoxy bis(triethanolaminato)zirconium, hydroxybis(lactato)zirconium, and oxycarbonate zirconium.

The deposition amount of the chromate-free chemical conversion coating film according to the present embodiment per surface is preferably 0.1 to 2 $g/m^2$, and more preferably 0.3 to 1 $g/m^2$. In the case where the deposition amount of the chemical conversion coating film per surface is less than 0.1 $g/m^2$, corrosion resistance with respect to deteriorated gasoline may decrease, and in the case where the deposition amount of the chemical conversion coating film per surface exceeds 2 $g/m^2$, the cost increases and weldability may deteriorate depending on a welding condition. The method of measuring the deposition amount of the chemical conversion coating film per surface is not particularly limited. The measurement can be performed thorough a known measurement method, and can be performed through a gravimetric method or an X-ray fluorescence method, for example. The gravimetric method used here is a method involving measuring a weight of a sample whose area is defined, then forming the chemical conversion coating film, and determining a deposition amount from the difference with a weight of the product. Further, the X-ray fluorescence method is a method involving creating in advance a calibration curve with a deposition amount-known sample by means of the gravimetric method or the like, and calculating a deposition amount from an X-ray fluorescence intensity of a sample of interest.

Here, the chromate-free chemical conversion coating film according to the present embodiment can be formed through a known method. For example, the method involves preparing application liquid containing predetermined component(s) described above, and applying the prepared application liquid over the Zn—Ni alloy plated layer through a known method such as bar coater and roll coater. Then, the obtained applied film may be heated and dried at predetermined heating temperature.

Regarding a crack in the Zn—Ni alloy plated layer according to the present embodiment, a more preferred embodiment will be described below.

The presence of the crack can be confirmed by embedding a sample in a resin, performing cross section vertical polishing, and observing a cross section using a SEM. In this case, observing a visual field of 100 μm at approximately 1000-fold magnification, it is more preferred that the number of cracks starting from the plated surface layer and reaching the base metal be more than or equal to 5 and less than or equal to 50. In the case where the number of cracks is small, for example, in the case where the number of cracks in the visual field of 100 μm is less than 5, the fuel corrosion resistance tends to decrease. On the other hand, in the case where the number of cracks is too large, for example, in the case where the number of cracks in the visual field of 100 μm exceeds 50, general corrosion resistance such as corrosion resistance with respect to a brine environment tends to decrease. In the Zn—Ni alloy plated layer according to the present embodiment, the number of cracks in the visual field of 100 μm is more preferably more than or equal to 10 and less than or equal to 40.

Moreover, in the case where cracks are observed in the above-mentioned method and a crack having the largest opening width among the cracks starting from the plated surface layer and reaching the base metal is observed at approximately 10000-fold magnification to determine the maximum width, the obtained maximum width is desirably less than 0.5 μm. In the case where the maximum width is more than or equal to 0.5 μm, general corrosion resistance such as corrosion resistance with respect to a brine environment tends to decrease.

In order to obtain the best corrosion resistance with respect to deteriorated gasoline, it is important to take into account the relationship between the number of cracks and a concentration of a total of amounts in terms of metal of P+V+Ti+Zr, which are eluted components for corrosion inhibition. To be specific, in the case where the number of cracks is small, it is important that the concentration of the eluted components be kept higher, and on the other hand, in the case where the number of cracks is large, satisfactory corrosion resistance with respect to deteriorated gasoline can be obtained in a concentration of the eluted components of a relatively wide range. As a result of conducting a detailed investigation, to be specific, the best corrosion resistance with respect to deteriorated gasoline can be obtained if the number X of cracks (in a visual field of 100 μm) and the concentration Y (%) of the total of amounts in terms of metal of P+V+Ti+Zr satisfy the following relationship of Expression (I).

$$Y \geq -0.06X + 6.8 \quad (I)$$

In order to obtain the best characteristics in the corrosion resistance with respect to deteriorated gasoline and general corrosion resistance such as corrosion resistance with respect to a brine environment, it is advisable to satisfy Expression (I), to make the number of cracks starting from the plated surface layer and reaching the base metal more than or equal to 5 and less than 50 (in the visual field of 100 μm), and to make the maximum width of the crack less than 0.5 μm.

The deposition amount of the Zn—Ni alloy plated layer according to the present embodiment is preferably 5 to 40 g/m² per surface. In the case where the deposition amount of the Zn—Ni alloy plated layer per surface is less than 5, the corrosion resistance with respect to deteriorated gasoline tends to be insufficient. Further, in the case where the deposition amount of the Zn—Ni alloy plated layer per surface exceeds 40 g/m², although the corrosion resistance with respect to deteriorated gasoline is imparted, but it is disadvantageous in terms of cost, therefore it is not preferred. Note that, from the viewpoint of a coating property, the deposition amount of the Zn—Ni alloy plated layer per surface is preferably 0.01 to 0.5 g/m². Note that the Ni content in the Zn—Ni alloy plated layer is not particularly limited, and is preferably 9 to 14 mass %, the range in which the corrosion resistance with respect to deteriorated gasoline becomes satisfactory. The Zn—Ni alloy plated layer may contain a known third component, for example, metals such as Fe, Co, Sn, and Cr, and the underneath the Zn—Ni alloy plated layer may have pre-plating of Fe and Ni, for example.

Note that the deposition amount of the Zn—Ni alloy plated layer per surface can be controlled through a quantity of electricity (amount of coulomb) in the case of using an electroplating method, for example, and can also be measured afterward. The measurement method of the deposition amount of the Zn—Ni alloy plated layer per surface is not particularly limited, and the measurement can be performed thorough a known measurement method, for example, through a gravimetric method or an X-ray fluorescence method. The gravimetric method used here is a method involving measuring a weight of a plated sample whose area is defined, dissolving only the plated layer in hydrochloric acid, and determining a deposition amount from the difference with a weight after the dissolving. Further, the X-ray fluorescence method is a method involving creating in advance a calibration curve with a deposition amount-known sample by means of the gravimetric method or the like, and calculating a deposition amount from an X-ray fluorescence intensity of a sample of interest.

The method of forming a crack in the Zn—Ni alloy plated layer according to the present embodiment is not limited, and treatment in an acidic aqueous solution after the plating is preferably used. In particular, in the case where the Zn—Ni alloy plated layer is formed by performing electroplating in an acidic plating solution, a method is appropriately used, involving cutting electricity after the plating and immersing the resultant in a plating solution in the state with no electricity. The number of cracks and the maximum width can be adjusted by a concentration of a treatment bath, temperature, or a treatment time. In the case where treatment is carried out using an acidic plating bath, the number of cracks has particularly high dependency on temperature, and, the higher the temperature, the number tends to increase. On the other hand, the crack width has high dependency on time, and, in the case where there is an attempt to suppress the crack width, the time for the treatment may be made short. In the case where the treatment is performed at high temperature for a short period of time, the number of cracks is large and the crack width is not too large. On the other hand, in the case where the treatment is performed at low temperature for a long period of time, the number of cracks is not too large, but the crack width tends to increase.

The configuration of the present invention described above relates to the inner surface of a fuel tank, in which the fuel corrosion resistance becomes a problem. The outer surface of the fuel tank is not particularly limited. The surface to be the outer surface of the fuel tank does not necessarily have the Zn—Ni alloy plated layer, may have the Zn—Ni alloy plated layer, and may have, in addition, the chromate-free chemical conversion coating film over the Zn—Ni alloy plated layer.

EXAMPLES

Next, the steel sheet for a fuel tank according to the present invention will be described further specifically with reference to Examples and Comparative Examples. Note that Examples shown below are merely examples of the steel sheet for a fuel tank according to the present invention, and the steel sheet for a fuel tank according to the present invention is not limited to the following examples.

Experiment 1

Examples 1 to 27 and Comparative Examples 1 to 6

An extra-low carbon steel sheet was used as an original sheet, a sulfuric acid acidic plating bath was used, electroplating was performed, and a Zn—Ni alloy plated layer whose deposition amount per surface was 15 g/m² and containing 10 mass % of Ni was formed. The resultant was held in the plating bath for three seconds in the state that the electricity was cut, and a predetermined plated layer-crack was formed. Note that the sulfuric acid acidic plating bath that was used was a bath of 50° C. containing 200 g/L of zinc sulfate heptahydrate, 380 g/L of nickel sulfate hexahydrate, 80 g/L of sodium sulfate, and 10 g/L of sulfuric acid. After that, each of the chromate-free chemical conversion coating films was formed in a predetermined amount over the obtained Zn—Ni alloy plated layer, the chromate-free chemical conversion coating films being obtained by making a base coating film shown in Table 1 contain the phosphoric acid compound and/or the phosphonic acid compound, the vanadium compound, and the titanium compound and/or the zirconium compound in amounts shown in Table 2. The chromate-free chemical conversion coating film was formed through application using a bar coater and baking in a hot air drying furnace (ultimate sheet temperature: 100° C.). Note that the deposition amount of the chromate-free chemical conversion coating film and the concentration of the total of amounts in terms of metal of P+V+Ti+Zr were measured through the X-ray fluorescence method described above.

TABLE 1

| No | Composition |
|---|---|
| a | Condensation polymer of 3-glycidoxypropyl trimethoxy silane and 3-aminopropyl triethoxy silane in a ratio of 1:1 (molecular weight of approximately 3000) |
| b | Condensation polymer of 3-glycidoxypropyl trimethoxy silane and 3-aminopropyl triethoxy silane in a ratio of 3:2 (molecular weight of approximately 2500) |
| c | Mixture of Na neutralized ionomer resin, silica, and 3-glycidoxypropyl trimethoxy silane in a ratio of 100:30:3 |

TABLE 2

| | | a1 | a2 | a3 | a4 | a5 | a6 | a7 | a8 | a9 | a10 | a11 | a12 | b1 | b2 | b3 |
|---|---|---|---|---|---|---|---|---|---|---|---|---|---|---|---|---|
| Type of base coating film | | a | a | a | a | a | a | a | a | a | a | a | a | b | b | b |
| Phosphoric acid compound or phosphonic acid compound | Phosphoric acid | 2.5 | 2 | 2.7 | 3 | 3.4 | 5 | 5 | | 5 | | 3 | 1.8 | 2.5 | 2 | 2.7 |
| | Magnesium primary phosphate | | | | | | | | 4.5 | | | | | | | |
| | 1-hydroxy-ethylidene-1,1'-diphosphonic acid | | | | | | | | 5 | | 5 | 10 | | | | |
| Vanadium compound | Vanadyl acetylacetonate | 1.4 | 2.9 | 2 | 2.3 | 2.5 | 4 | 5 | 2 | | 2 | 2.3 | 4 | 1.4 | 2.9 | 2 |
| | Ammonium metavanadate | | | | | | | | 0.5 | 3 | | | | | | |
| Titanium compound or zirconium compound | Hexafluoro-titanate | 1.1 | 0.5 | 1.2 | 1.2 | 1.5 | 2 | 5 | 1.1 | 2.5 | | 1.5 | | 1.1 | 0.5 | 1.2 |
| | Titanium diisopropoxy bis(acetyl-acetonate) | | | | | | | | 0.5 | 2 | | | | | | |
| | Hexafluoro-zirconate | | | | | | | | | | 3 | | 3 | | | |
| Concentration of P + V + Ti + Zr (mass %) | | 5 | 5.4 | 5.9 | 6.5 | 7.4 | 11 | 20 | 8.6 | 14 | 9 | 17 | 8.8 | 5 | 5.4 | 5.9 |

| | | b4 | b5 | b6 | aa1 | aa2 | aa3 | aa4 | aa5 | c1 | Remarks |
|---|---|---|---|---|---|---|---|---|---|---|---|
| Type of base coating film | | b | b | b | a | a | a | a | a | c | — |
| Phosphoric acid compound or phosphoric acid compound | Phosphoric acid | 3 | 3.4 | 5 | 3 | 3.5 | | 1.5 | 5 | 2.5 | Concentration of P (mass %) |
| | Magnesium primary phosphate | | | | | | | | | | |
| | 1-hydroxy-ethylidene-1,1'-diphosphonic acid | | | | | | | | | 12 | |
| Vanadium compound | Vanadyl acetylacetonate | 2.3 | 2.5 | 4 | 3 | | 3.5 | 1 | 6 | 1.4 | Concentration of V (mass %) |
| | Ammonium metavanadate | | | | | | | | | | |
| Titanium compound or zirconium compound | Hexafluoro-titanate | 1.2 | 1.5 | 2 | | 2.5 | 2.5. | 1 | 2 | 1.1 | Concentration of Ti and Zr (mass %) |
| | Titanium diisopropoxy bis(acetyl-acetonate) | | | | | | | | | | |
| | Hexafluoro-zirconate | | | | | | | | | | |
| Concentration of P + V + Ti + Zr (mass %) | | 6.5 | 7.4 | 11 | 6 | 6 | 6 | 3.5 | 25 | 5 | |

Comparative Examples 7 to 10

Each preparation was performed in the same manner as described above, except that the treatment of being immersed in a plating bath in the state with no electricity after the Zn—Ni alloy plating was not performed.

[Observation on Plated Layer-Crack]

Each of the prepared samples was embedded in a resin, cross section vertical polishing was performed, and the cross section was observed using a SEM. A visual field of 100 μm was observed at 1000-fold magnification, and the number of cracks starting from the plated surface layer and reaching the base metal was counted. Moreover, a crack having the largest opening width among the cracks starting from the plated surface layer and reaching the base metal in the visual field was observed using the SEM at approximately 10000-fold magnification to measure the maximum width.

[Corrosion Resistance with Respect to Deteriorated Gasoline]

Each of the prepared samples was molded in a cylinder shape having an inside diameter of 50 mm and a depth of 35 mm, which imitates a fuel tank. After removing oil through grease removing treatment, a flaw that reaches up to the base metal was made by a cutter on the inner surface base (which imitates a flaw caused by press working). Then, test liquid that imitates the deteriorated gasoline (gasoline containing 100 ppm of formic acid, 300 ppm of acetic acid, 100 ppm of chloride ions, 1.0 capacity % of water) was enclosed, and was retained at 40° C. for two months. After that, rust was removed, a maximum reduction in sheet thickness (mm) due to corrosion was measured.

[SST Corrosion Resistance]

A back surface and an edge of each of the samples were sealed and a salt spray test defined in JISZ2371 was performed for 72 hours to measure an area proportion (%) of white rust occurrence.

Table 3 shows evaluation results for each sample of a state of a plated layer-crack, a type of a chemical conversion coating film that was used, a deposition amount of a chemical conversion, a water contact angle, corrosion resistance with respect to deteriorated gasoline, and SST corrosion resistance. Note that the evaluation results of the corrosion resistance with respect to deteriorated gasoline can be determined as satisfactory in the case where the maximum reduction in sheet thickness was less than 0.05 mm. Further, the SST corrosion resistance can be determined as satisfactory in the case where the rate of white rust occurrence was less than 5%.

TABLE 3

| | | Zn—Ni alloy plated layer | | Chemical conversion treated coating film | | | Corrosion resistance with respect to deteriorated gasoline (mm) | SST corrosion resistance (%) | Remarks |
|---|---|---|---|---|---|---|---|---|---|
| | | Number of cracks | Maximum width (μm) | Type of chemical conversion coating film | Deposition amount (g/m²) | P + V + Ti + Zr (mass %) | | | |
| Example | 1 | 13 | 0.3 | a1 | 0.7 | 5 | 0.04 | 0 | |
| | 2 | 13 | 0.3 | a2 | 0.7 | 5.4 | 0.02 | 0 | |
| | 3 | 13 | 0.3 | a3 | 0.7 | 5.9 | 0.01 | 0 | |
| | 4 | 13 | 0.3 | a4 | 0.7 | 6.5 | 0 | 0 | |
| | 5 | 13 | 0.3 | a5 | 0.7 | 7.4 | 0 | 0 | |
| | 6 | 13 | 0.3 | a6 | 0.7 | 11 | 0 | 0 | |
| | 7 | 13 | 0.3 | a7 | 0.7 | 20 | 0 | 2 | |
| | 8 | 13 | 0.3 | a8 | 0.7 | 8.6 | 0 | 0 | |
| | 9 | 13 | 0.3 | a9 | 0.7 | 13.5 | 0 | 0 | |
| | 10 | 13 | 0.3 | a10 | 0.7 | 9 | 0 | 0 | |
| | 11 | 13 | 0.3 | a11 | 0.7 | 16.8 | 0 | 1 | |
| | 12 | 13 | 0.3 | a12 | 0.7 | 8.8 | 0 | 0 | |
| | 13 | 13 | 0.3 | b1 | 0.7 | 5 | 0.02 | 0 | |
| | 14 | 13 | 0.3 | b2 | 0.7 | 5.4 | 0.01 | 0 | |
| | 15 | 13 | 0.3 | b3 | 0.7 | 5.9 | 0.01 | 0 | |
| | 16 | 13 | 0.3 | b4 | 0.7 | 6.5 | 0 | 0 | |
| | 17 | 13 | 0.3 | b5 | 0.7 | 7.4 | 0 | 0 | |
| | 18 | 13 | 0.3 | b6 | 0.7 | 11 | 0 | 0 | |
| | 19 | 13 | 0.3 | a3 | 0.3 | 5.9 | 0 | 2 | |
| | 20 | 13 | 0.3 | a3 | 1 | 5.9 | 0 | 0 | |
| | 21 | 13 | 0.3 | a3 | 1.6 | 5.9 | 0 | 0 | |
| | 22 | 13 | 0.3 | a4 | 0.1 | 6.5 | 0.04 | 3 | |
| | 23 | 13 | 0.3 | a4 | 0.5 | 6.5 | 0 | 0 | |
| | 24 | 13 | 0.3 | a4 | 2 | 6.5 | 0 | 0 | |
| | 25 | 13 | 0.3 | b4 | 0.4 | 6.5 | 0 | 1 | |
| | 26 | 13 | 0.3 | b4 | 1.2 | 6.5 | 0 | 0 | |
| | 27 | 13 | 0.3 | b4 | 1.7 | 6.5 | 0 | 0 | |
| Comparative Example | 1 | 13 | 0.3 | aa1 | 0.7 | — | 0.1 | 5 | Ti and Zr not included |
| | 2 | 13 | 0.3 | aa2 | 0.7 | — | 0.12 | 8 | V not included |
| | 3 | 13 | 0.3 | aa3 | 0.7 | — | 0.15 | 7 | P not included |
| | 4 | 13 | 0.3 | aa4 | 0.7 | 3.5 | 0.13 | 0.1 | |
| | 5 | 13 | 0.3 | aa5 | 0.7 | 25 | 0.06 | 50 | |
| | 6 | 13 | 0.3 | c1 | 0.7 | — | 0.25 | 2 | Organic resin-based coating film |
| | 7 | 0 | — | a3 | 0.7 | 5.9 | 0.12 | 0 | |

TABLE 3-continued

| | Zn—Ni alloy plated layer | | Chemical conversion treated coating film | | | Corrosion resistance with respect to deteriorated gasoline (mm) | SST corrosion resistance (%) | Remarks |
|---|---|---|---|---|---|---|---|---|
| | Number of cracks | Maximum width (μm) | Type of chemical conversion coating film | Deposition amount (g/m²) | P + V + Ti + Zr (mass %) | | | |
| 8 | 0 | — | aa3 | 0.7 | — | 0.14 | 0 | P not included |
| 9 | 0 | — | aa4 | 0.7 | 3.5 | 0.1 | 0 | |
| 10 | 0 | — | c1 | 0.7 | — | 0.19 | 0.1 | Organic resin-based coating film |

As is clear from Table 3, Examples of the present invention each showed satisfactory characteristics.

On the other hand, Comparative Examples 1, 2, and 3 did not contain any one of P, V, and Ti (and/or Zr), which are constituent elements of the chromate-free chemical conversion coating film according to the present invention, and had poor corrosion resistance with respect to deteriorated gasoline and poor SST corrosion resistance. Further, even if P, V, and Ti (and/or Zr) were contained, in the case where the total concentration of P, V, and Ti (and/or Zr) was less than the lower limit of the present invention (Comparative Example 4), the corrosion resistance with respect to deteriorated gasoline was poor, and, in the case where the total concentration of P, V, and Ti (and/or Zr) exceeded the upper limit (Comparative Example 5), the corrosion resistance with respect to deteriorated gasoline and also the SST corrosion resistance were poor. The coating film that mainly contained an organic resin (Comparative Example 6) also had poor corrosion resistance with respect to deteriorated gasoline. Moreover, in the case where the Zn—Ni alloy plated layer did not have a crack (Comparative Examples 7 to 10), the corrosion resistance with respect to deteriorated gasoline was poor. Note that, among the examples that did not satisfy the constituent elements of the chromate-free chemical conversion coating film according to the present invention, the examples which had the Zn—Ni alloy plated layers with cracks tended to have decreased corrosion resistance with respect to deteriorated gasoline and decreased SST corrosion resistance (comparisons between Comparative Examples 3 and 8, between 4 and 9, and between 6 and 10).

As described above, it was found that satisfactory characteristics can be obtained with a combination of a plated layer-crack and a predetermined chromate-free chemical conversion coating film.

Experiment 2

Examples 28 to 80

An extra-low carbon steel sheet was used as an original sheet, a sulfuric acid acidic plating bath was used, electroplating was performed, and a Zn—Ni alloy plated layer whose deposition amount per surface was 15 g/m² and containing 10 mass % of Ni was formed. A predetermined plated layer-crack was formed by varying temperature and time during immersion in the plating bath in the state that the electricity was cut. The plating bath that was used was the same as the plating bath used in Experiment 1, and the temperature was varied between 50 to 65° C., and the immersion time was varied between 1 to 5 seconds. After that, each of the chromate-free chemical conversion coating films having different compositions shown in Table 2 was formed in a predetermined amount in the same manner as in Experiment 1. Further, the deposition amount of the chromate-free chemical conversion coating film and the concentration of the total of amounts in terms of metal of P+V+Ti+Zr were measured through the X-ray fluorescence method described above.

Performance evaluation was carried out in the same manner as Experiment 1 described above.

Table 4 shows evaluation results for each sample of a state of a plated layer-crack, a type of a chemical conversion coating film that was used, a deposition amount of a chemical conversion, corrosion resistance with respect to deteriorated gasoline, and SST corrosion resistance.

TABLE 4

| | | Zn—Ni alloy plated layer | | Chemical conversion treated coating film | | | | Corrosion resistance with respect to deteriorated gasoline (mm) | SST corrosion resistance (%) |
|---|---|---|---|---|---|---|---|---|---|
| | | Number of cracks | Maximum width (μm) | Type of chemical conversion coating film | Deposition amount (g/m²) | P + V + Ti + Zr (mass %) | Satisfy Expression (I)? | | |
| Example | 28 | 5 | 0.15 | a1 | 0.8 | 5 | No | 0.04 | 0 |
| | 29 | 5 | 0.15 | a2 | 0.8 | 5.4 | No | 0.03 | 0 |
| | 30 | 5 | 0.15 | a3 | 0.8 | 5.9 | No | 0.02 | 0 |
| | 31 | 5 | 0.15 | a4 | 0.8 | 6.5 | Yes | 0 | 0 |
| | 32 | 5 | 0.15 | a5 | 0.8 | 7.4 | Yes | 0 | 0 |
| | 33 | 5 | 0.15 | a6 | 0.8 | 11 | Yes | 0 | 0 |
| | 34 | 5 | 0.15 | a8 | 0.8 | 8.6 | Yes | 0 | 0 |

TABLE 4-continued

| | Zn—Ni alloy plated layer | | Chemical conversion treated coating film | | | | Corrosion resistance with respect to deteriorated gasoline (mm) | SST corrosion resistance (%) |
|---|---|---|---|---|---|---|---|---|
| | Number of cracks | Maximum width (μm) | Type of chemical conversion coating film | Deposition amount (g/m$^2$) | P + V + Ti + Zr (mass %) | Satisfy Expression (I)? | | |
| 35 | 5 | 0.15 | a9 | 0.8 | 13.5 | Yes | 0 | 0 |
| 36 | 5 | 0.15 | a11 | 0.8 | 16.8 | Yes | 0 | 0 |
| 37 | 49 | 0.4 | a1 | 0.8 | 5 | Yes | 0 | 0 |
| 38 | 49 | 0.4 | a2 | 0.8 | 5.4 | Yes | 0 | 0 |
| 39 | 49 | 0.4 | a3 | 0.8 | 5.9 | Yes | 0 | 0 |
| 40 | 49 | 0.4 | a4 | 0.8 | 6.5 | Yes | 0 | 0 |
| 41 | 49 | 0.4 | a5 | 0.8 | 7.4 | Yes | 0 | 0 |
| 42 | 49 | 0.4 | a6 | 0.8 | 11 | Yes | 0 | 0 |
| 43 | 49 | 0.4 | a8 | 0.8 | 8.6 | Yes | 0 | 0 |
| 44 | 49 | 0.4 | a9 | 0.8 | 13.5 | Yes | 0 | 0.3 |
| 45 | 49 | 0.4 | a11 | 0.8 | 16.8 | Yes | 0 | 0.8 |
| 46 | 40 | 0.4 | a1 | 0.8 | 5 | Yes | 0 | 0 |
| 47 | 40 | 0.4 | a2 | 0.8 | 5.4 | Yes | 0 | 0 |
| 48 | 40 | 0.4 | a3 | 0.8 | 5.9 | Yes | 0 | 0 |
| 49 | 40 | 0.4 | a4 | 0.8 | 6.5 | Yes | 0 | 0 |
| 50 | 40 | 0.4 | a5 | 0.8 | 7.4 | Yes | 0 | 0 |
| 51 | 40 | 0.4 | a6 | 0.8 | 11 | Yes | 0 | 0 |
| 52 | 40 | 0.4 | a8 | 0.8 | 8.6 | Yes | 0 | 0 |
| 53 | 40 | 0.4 | a9 | 0.8 | 13.5 | Yes | 0 | 0 |
| 54 | 40 | 0.4 | a11 | 0.8 | 16.8 | Yes | 0 | 0 |
| 55 | 16 | 0.3 | a1 | 0.8 | 5 | No | 0.04 | 0 |
| 56 | 16 | 0.3 | a2 | 0.8 | 5.4 | No | 0.02 | 0 |
| 57 | 16 | 0.3 | a3 | 0.8 | 5.9 | Yes | 0 | 0 |
| 58 | 16 | 0.3 | a4 | 0.8 | 6.5 | Yes | 0 | 0 |
| 59 | 16 | 0.3 | a5 | 0.8 | 7.4 | Yes | 0 | 0 |
| 60 | 16 | 0.3 | a6 | 0.8 | 11 | Yes | 0 | 0 |
| 61 | 16 | 0.3 | a8 | 0.8 | 8.6 | Yes | 0 | 0 |
| 62 | 16 | 0.3 | a9 | 0.8 | 13.5 | Yes | 0 | 0 |
| 63 | 16 | 0.3 | a11 | 0.8 | 16.8 | Yes | 0 | 0 |
| 64 | 28 | 0.25 | a1 | 0.8 | 5 | No | 0.03 | 0 |
| 65 | 28 | 0.25 | a2 | 0.8 | 5.4 | Yes | 0 | 0 |
| 66 | 28 | 0.25 | a3 | 0.8 | 5.9 | Yes | 0 | 0 |
| 67 | 28 | 0.25 | a4 | 0.8 | 6.5 | Yes | 0 | 0 |
| 68 | 28 | 0.25 | a5 | 0.8 | 7.4 | Yes | 0 | 0 |
| 69 | 28 | 0.25 | a6 | 0.8 | 11 | Yes | 0 | 0 |
| 70 | 28 | 0.25 | a8 | 0.8 | 8.6 | Yes | 0 | 0 |
| 71 | 28 | 0.25 | a9 | 0.8 | 13.5 | Yes | 0 | 0 |
| 72 | 28 | 0.25 | a11 | 0.8 | 16.8 | Yes | 0 | 0 |
| 73 | 31 | 0.5 | a1 | 0.8 | 5 | Yes | 0 | 0.5 |
| 74 | 31 | 0.5 | a2 | 0.8 | 5.4 | Yes | 0 | 1 |
| 75 | 31 | 0.5 | a3 | 0.8 | 5.9 | Yes | 0 | 2 |
| 76 | 31 | 0.5 | a4 | 0.8 | 6.5 | Yes | 0 | 2 |
| 77 | 39 | 0.7 | a1 | 0.8 | 5 | Yes | 0 | 2 |
| 78 | 39 | 0.7 | a2 | 0.8 | 5.4 | Yes | 0 | 3 |
| 79 | 39 | 0.7 | a3 | 0.8 | 5.9 | Yes | 0 | 3 |
| 80 | 39 | 0.7 | a4 | 0.8 | 6.5 | Yes | 0 | 3 |

As is clear from Table 4, Examples of the present invention each showed satisfactory characteristics.

In particular, regarding the corrosion resistance with respect to deteriorated gasoline, each of Examples that satisfies Expression (I) had a reduction in sheet thickness of 0, which exhibited particularly excellent corrosion resistance with respect to deteriorated gasoline. Further, each of Examples having a crack width of less than 0.5 μm had a rate of white rust occurrence in the SST corrosion resistance of less than 1%, which exhibited excellent SST corrosion resistance. In particular, in the case where the crack width was less than 0.5 μm and the number of cracks was less than 50, the rate of white rust occurrence in the SST corrosion resistance was zero under any condition, which was particularly excellent.

As described above, each of Examples that satisfies Expression (I), has the number of cracks of more than or equal to 5 and less than 50, and has the crack width of less than 0.5 μm was particularly excellent in the corrosion resistance with respect to deteriorated gasoline and the SST corrosion resistance.

Experiment 3

Examples 81 to 88

Each of the surfaces to be the inner surface of a fuel tank was prepared in the same manner as in Example 1, but each of the surfaces to be the outer surface of a fuel tank was varied. In Example 81, the outer surface was not provided with a coating film. In each of Examples 82 and 83, the plating on the surface to be the outer surface was completely removed through grinding with a brush. After that, in Example 82, a predetermined coating film was applied. In each of Examples 84 to 88, on the outer surface from which the plating was completely removed through the above method, predetermined amounts of Zn and Ni were deposited again through electroplating.

Performance evaluation was carried out as follows.

(Coating Property)

The coating property of the surface to be the outer surface of a fuel tank was evaluated.

Usually, pre-coating treatment (zinc phosphate treatment) and electrodeposition were performed for the outer surface of the fuel tank for an automobile or a motorcycle, and the external appearance was evaluated by visual observation. Example of an acceptable level was evaluated as "Satisfactory", and Example of remarkably uniformly fine was evaluated as "Excellent".

(Coating Property after Storage)

To the prepared sample, rust-resistant oil (NOX-RUST 530, manufactured by Parker Industries, Inc.) was applied extremely slightly (approximately 0.1 g/m$^2$), and then the resultant was packed in a manner that the surface to be the inner surface and the surface to be the outer surface came into contact with each other so that the state looked like a coil. Using a sample after stored in 50° C. 98% RH environment for one month, the same coating as in the coating property evaluation was performed, and the evaluation was performed using the same criteria (Weldability)

The surfaces to be the inner surfaces were placed together and seam welding was performed. A range of current in which an appropriate nugget can be obtained was determined by changing the welding current. The conditions are as follows.

Electrode: a disc-shaped electrode made of a Cu—Cr alloy, in which a cross section at a central part had a radius of 15 mm and a width of 4.5 mm and a cross section at an end part had a radius of 4 mm and a width of 8 mm Welding method: piling of two sheets, lap seam welding Welding pressure: 400 kgf (note that 1 kgf is approximately 9.8 N)

Welding time: 2/50 sec on, 1/50 sec off

Cooling: inner part water cooled, and outer part water cooled

Welding speed: 2.5 in/min

The results are shown in Table 5. As is clear from Table 5, Examples of the present invention each showed satisfactory characteristics. Also, it was found that the coating property, the coating property after storage, and the weldability of the steel sheet particularly improved in the case where the total deposition amount of Zn and Ni was 0.01 to 0.5 g/m$^2$.

The preferred examples of the present invention have been described above, whilst the present invention is not limited to the above examples. A person skilled in the art may find various alterations and modifications within the scope of the appended claims, and it should be understood that they will naturally come under the technical scope of the present invention.

INDUSTRIAL APPLICABILITY

The present invention provides the steel sheet which shows excellent corrosion resistance under a severer fuel environment containing dew condensation water in addition to deteriorated gasoline, by forming, over the Zn—Ni alloy plated layer, the chromate-free chemical conversion coating film in which the phosphoric acid compound and/or the phosphonic acid compound+the vanadium compound+the titanium compound and/or the zirconium compound are blended at a specific proportion in terms of metal.

The present invention provides the steel sheet having different surface states between the inner and outer surfaces, by making the surface to be the outer surface of the fuel tank to be a base metal and making the surface to be the inner surface of the fuel tank to be the chromate-free chemical conversion coating film. Such a steel sheet according to the present invention has every performance necessary from the production of the fuel tank to the using of the fuel tank: (i) excellent workability that is necessary during processing and welding of the steel sheet to make the steel sheet into a tank shape; (ii) excellent coating property that is necessary during coating of the processed tank to enhance the visual quality of the external appearance; and (iii) excellent corrosion resistance that is necessary for using the produced tank for a long time.

The steel sheet according to the present invention also has an effect that is not conventionally achieved in the point that the surface states that are different between the inner and outer surfaces interact with each other and differences in performances between the inner and outer surfaces can be further exhibited. To be specific, since a surplus of the coating (oil) applied to the base metal on the outer surface of the fuel tank is adsorbed on the chromate-free chemical conversion coating film on the inner surface of the fuel tank, the coating property of the outer surface improves.

The invention claimed is:

1. A steel sheet for a fuel tank, the steel sheet comprising:
a base metal as a base material;
a Zn—Ni alloy plated layer having a deposition amount of at least 5 g/m$^2$, being placed on one surface of the base metal, and

TABLE 5

| | | Deposition amount on outer surface side | | Coating film on outer surface side | | Outer surface performance | | |
|---|---|---|---|---|---|---|---|---|
| | | Zn | Ni | Type | Deposition amount | Coating property | Coating property after storage | Weldability |
| Example | 81 | 13.5 | 1.5 | — | — | Satisfactory | Satisfactory | 3.2 kA |
| | 82 | 0 | 0 | a1 | 0.7 | Satisfactory | Satisfactory | 3.5 kA |
| | 83 | 0 | 0 | — | — | Satisfactory | Satisfactory | 3.7 kA |
| | 84 | 0.5 | 0 | — | — | Excellent | Excellent | 3.7 kA |
| | 85 | 0 | 0.1 | — | — | Excellent | Excellent | 3.7 kA |
| | 86 | 0.2 | 0.1 | — | — | Excellent | Excellent | 3.7 kA |
| | 87 | 0 | 0.01 | — | — | Excellent | Excellent | 3.7 kA |
| | 88 | 1.0 | 0 | — | — | Satisfactory | Satisfactory | 3.7 kA | a chromate-free chemical conversion coating film placed over the Zn—Ni alloy plated layer, wherein the one surface of the base metal has the Zn—Ni alloy plated layer and the chromate-free chemical conversion coating film, and a surface opposite to the one surface does not have the chromate-free chemical conversion coating film, and wherein the Zn—Ni alloy plated layer has cracks starting from an interface between the Zn—Ni alloy plated layer and the chromate-free chemical conversion coating film and reaching an interface between the Zn—Ni alloy plated layer and the base metal, the chromate-free chemical conversion coating film consists of an organosilicon compound consisting of a condensation polymer of a silane coupling agent, a phosphoric acid compound and/or a phosphonic acid compound, a vanadium compound, and a titanium compound and/or a zirconium compound, and a total mass of P+V+Ti+Zr with respect to the total solid content of the chemical conversion film, per surface of the chromate-tree chemical conversion coating film, of the phosphoric acid compound and/or the phosphonic acid compound+the vanadium compound+the titanium compound and/or the zirconium compound, is more than or equal to 5 mass % and less than or equal to 20 mass %, wherein a total deposition amount of Zn and Ni on the surface opposite to the one surface is 0.01 to 0.5 g/m$^2$.

2. The steel sheet for a fuel tank according to claim 1, wherein in the case where a cross section of the Zn—Ni alloy plated layer is observed, the number of the cracks in a visual field of 100 μm is more than or equal to 5 and less than or equal to 50.

3. The steel sheet for a fuel tank according to claim 1, wherein the number X of the cracks in a visual field of 100 μm obtained by observing the cross section of the Zn—Ni alloy plated layer of the one surface and a concentration Y(mass %) of the total mass of P+V+Ti+Zr with respect to the total solid content of the chemical conversion film satisfy a relationship represented by the following formula (I), $$Y \geq 0.06X + 6.8 \qquad (1).$$

4. The steel sheet for a fuel tank according to claim 3, wherein in the case where a cross section of the Zn—Ni alloy plated layer of the one surface is observed, the number of the cracks in the visual field of 100 μm is more than or equal to 5 and less than 50, and a maximum width of each of the cracks is less than 0.5 μm.

5. A steel sheet for a fuel tank, the steel sheet comprising:
a base metal as a base material;
a Zn—Ni alloy plated layer having a deposition amount of at least 5 g/m$^2$, being which is placed on one surface of the base metal; and
a chromate-free chemical conversion coating film placed over the Zn—Ni alloy plated layer, wherein the one surface of the base metal has the Zn—Ni alloy plated layer and the chromate-free chemical conversion coating film, and a surface opposite to the one surface does not have the chromate-free chemical conversion coating film, and wherein the Zn—Ni alloy plated layer has cracks starting from an interface between the Zn—Ni alloy plated layer and the chromate free chemical conversion coating film and reaching an interface between the Zn—Ni alloy plated layer and the base metal, the chromate-free chemical conversion coating film comprises an organosilicon compound comprising a condensation polymer of a silane coupling agent, a phosphoric acid compound and/or a phosphonic acid compound, a vanadium compound, and a titanium compound and/or a zirconium compound, and a total mass of P+V+Ti+Zr with respect to the total solid content of the chemical conversion film, per surface of the chromate-free chemical conversion coating film, of the phosphoric acid compound and/or the phosphonic acid compound+the vanadium compound+the titanium compound and/or the zirconium compound, is more than or equal to 5 mass % and less than or equal to 20 mass %, wherein a total deposition amount of Zn and Ni on the surface opposite to the one surface is 0.01 to 0.5 g/m$^2$.

* * * * *